(12) United States Patent
Down et al.

(10) Patent No.: US 10,704,384 B2
(45) Date of Patent: *Jul. 7, 2020

(54) DOWNHOLE RECEPTION AND TRANSMISSION OF ELECTROMAGNETIC DATA TELEMETRY SIGNALS

(71) Applicant: Phoenix Technology Services Inc., Calgary (CA)

(72) Inventors: Alexander Down, Calgary (CA); Aaron Logan, Calgary (CA); Theunis Van Schalkwyk, Calgary (CA); Rostyslav Kuchma, Clagary (CA); Mojtaba Kazemi Miraki, Calgary (CA)

(73) Assignee: Phoenix Technology Services Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,436

(22) Filed: Jul. 24, 2019

(65) Prior Publication Data

US 2019/0345817 A1    Nov. 14, 2019

Related U.S. Application Data

(63) Continuation of application No. 15/844,972, filed on Dec. 18, 2017, now Pat. No. 10,400,585.

(60) Provisional application No. 62/440,617, filed on Dec. 30, 2016.

(51) Int. Cl.
*E21B 47/12* (2012.01)
*E21B 17/00* (2006.01)
*E21B 44/00* (2006.01)
*G01V 11/00* (2006.01)

(52) U.S. Cl.
CPC ............ *E21B 47/12* (2013.01); *E21B 17/003* (2013.01); *E21B 44/005* (2013.01); *E21B 47/122* (2013.01); *G01V 11/002* (2013.01)

(58) Field of Classification Search
CPC ...... E21B 47/12; E21B 17/003; E21B 44/005; E21B 47/122; G01V 11/002
See application file for complete search history.

(56) References Cited

U.S. PATENT DOCUMENTS

| 5,163,714 | A  | 11/1992 | Issenmann |
| 5,260,661 | A  | 11/1993 | Vail, III |
| 6,975,121 | B2 | 12/2005 | Strack et al. |
| 8,400,326 | B2 | 3/2013  | Codazzi |

(Continued)

FOREIGN PATENT DOCUMENTS

WO    2017086956 A1    5/2017

*Primary Examiner* — Amine Benlagsir
(74) *Attorney, Agent, or Firm* — Oyen Wiggs Green & Mutala LLP (57) ABSTRACT

A retrievable receiver for electromagnetic telemetry signals originating from a first wellbore is located in a second wellbore. The receiver uses a casing of the second wellbore as an antenna. A signal pickup unit is provided on a multi-conductor wireline in the second wellbore. The signal pickup provides sensors (e.g. electrodes) for detecting signals at plural locations along the second wellbore. Signal reception can be optimized by adjusting the position of the wireline in the second wellbore and/or selecting sensor(s) for use in receiving the telemetry signals. The receiver may lack any active electronics in the second wellbore.

18 Claims, 7 Drawing Sheets

(56) References Cited

U.S. PATENT DOCUMENTS

| | | |
|---|---|---|
| 8,400,826 B2 | 3/2013 | Roohparvar et al. |
| 9,459,371 B1 | 10/2016 | Holmen et al. |
| 2006/0035591 A1* | 2/2006 | Young ................... E21B 47/12 455/63.1 |
| 2007/0247328 A1* | 10/2007 | Petrovic ............... G01V 11/002 340/853.7 |
| 2009/0278542 A1 | 11/2009 | Gard et al. |
| 2014/0167767 A1* | 6/2014 | Herrera .................. G01V 3/24 324/339 |
| 2015/0160364 A1* | 6/2015 | Hibbs ................. E21B 47/102 324/355 |
| 2015/0181688 A1* | 6/2015 | Perkins ................... H05H 3/06 376/119 |
| 2015/0369949 A1 | 12/2015 | Cuevas et al. |
| 2016/0010446 A1 | 1/2016 | Logan et al. |
| 2016/0259085 A1* | 9/2016 | Wilson ................. E21B 47/123 |
| 2016/0282501 A1* | 9/2016 | Hibbs ...................... G01V 3/20 |
| 2016/0334534 A1 | 11/2016 | Mandviwala et al. |
| 2016/0356911 A1 | 12/2016 | Wilson et al. |
| 2017/0247328 A1 | 8/2017 | Thirumalai Rajan et al. |
| 2017/0268330 A1 | 9/2017 | Derkacz et al. |
| 2017/0292367 A1* | 10/2017 | Fouda ..................... G01V 3/18 |

\* cited by examiner

DOWNHOLE RECEPTION AND TRANSMISSION OF ELECTROMAGNETIC DATA TELEMETRY SIGNALS

CROSS-REFERENCE TO RELATED APPLICATIONS

This application is a continuation of U.S. application Ser. No. 15/844,972 filed 18 Dec. 2017, which claims the benefit under 35 U.S.C. § 119 of U.S. Application No. 62/440,617 filed 30 Dec. 2016 and entitled DOWNHOLE RECEPTION AND TRANSMISSION OF ELECTROMAGNETIC DATA TELEMETRY SIGNALS which is hereby incorporated herein by reference for all purposes.

FIELD

This invention relates to subsurface drilling and in particular to data telemetry between subsurface equipment and surface equipment.

BACKGROUND

Subsurface drilling has application for example in recovering petrochemicals from subsurface reservoirs. In a typical drilling operation a rotating drill bit at the end of a drill string cuts a borehole. The drill bit may be rotated by turning the entire drill string and/or using a downhole motor such as a mud motor. Cuttings released by the drilling operation are generally removed from the borehole by flowing drilling fluid through the drill string. The drilling fluid flows back to the surface in an annular region of the borehole surrounding the drill string. Subsurface drilling may be used to make boreholes that are very deep (e.g. thousands of meters).

It is common to case a borehole after the borehole has been drilled. Casing typically takes the form of a steel pipe that surrounds the borehole and extends to a desired depth. Casing is used among other things to prevent fluids from entering or leaving the borehole and to preserve the integrity of the borehole. Casing may extend to very significant depths in the borehole.

It can be desirable to establish data communication between downhole equipment within a borehole and surface equipment. Such data communication may, for example be used to transmit measurements from downhole sensors. The measurements may, for example include one or more of: measurements of downhole conditions (e.g. temperature, pressure and/or vibration levels), well logging data (e.g. neutron, gamma, magnetic and/or resistivity measurements of formations surrounding the borehole), steering information such as direction and inclination of a part of the drill string, and information regarding the status of items of downhole equipment. This information may be used for a wide variety of purposes including controlling drilling operations, scientific inquiry, mapping downhole formations, etc.

One application of data telemetry is to carry measurement while drilling (MWD) information. MWD is often applied for directional drilling. A typical directional drilling assembly provides a downhole motor at a slight bend (typically 0-5 degrees) near the drill bit. The bend causes the drill to extend the wellbore in a direction that deviates from the current trajectory of the well bore when the drill pipe is held stationary at surface and drill bit rotation is driven entirely by the downhole motor. To drill in a desired direction, the operator or directional driller needs to understand the orientation of the deflecting mechanism. A device commonly known as a MWD tool is included in the BHA. The MWD tool provides the directional driller with realtime information about the orientation of the downhole motor and provides periodic measurements of the direction and inclination of the drilling tool in the wellbore. The MWD system encodes this information into a binary data stream that is transmitted to a surface computer that decodes the data stream and presents the information to the directional driller on surface or in a remote location via suitable data link.

Data telemetry from deep underground is technically challenging. A variety of technologies have been developed for downhole data telemetry. These different technologies each offer tradeoffs between factors such as cost, available data rate, compatibility with existing drilling equipment, and reliability. One technology that is advantageous in some applications is electromagnetic (EM) telemetry. EM telemetry transmits data by generating electrical signals that propagate through the earth.

A typical EM telemetry system for transmitting data from downhole equipment to surface equipment includes a drillstring component usually called a 'gap sub' that provides electrical insulation between parts of the drillstring above and below the gap sub. A downhole EM telemetry transmitter applies electrical potentials (voltages) across the gap sub. These electrical potentials are varied with time in a way that encodes data for transmission to the surface. EM telemetry signals typically have very low frequencies (e.g. frequencies of less than 20 Hz). Frequencies of 1 Hz or lower may be used in some cases. Higher frequencies tend to be attenuated too strongly to be detected at surface. Any of a wide variety of encoding schemes may be used to encode data into an EM telemetry signal.

Application of potential differences across the gap sub allows electrical current to be transmitted into the formations surrounding the drill string. This current is typically detected using an array of ground stakes (usually copper coated rods driven into the ground) at surface. Patterns of variation in the detected current are processed at surface equipment to recover the encoded data.

Detected signals typically have very low amplitudes (e.g. microvolt-level). Electrical noise from pumps and other electrical equipment associated with a drilling operation may interfere with reception of EM telemetry signals.

EM telemetry signals can be strongly attenuated by certain formation types such as salts, and anhydrites. Such formations present a physical barrier to transmission of EM telemetry signals to the surface. Even in the absence of such formations the attenuation of EM telemetry signals presents a limit to the depth from which EM telemetry signals can be successfully transmitted to surface equipment. Using waterbased drilling fluids also tends to increase attenuation of EM telemetry signals.

EM telemetry signals are often very weak when they reach the surface (received signals are often measured below 100 μV). Electrical equipment associated with a drilling operation (e.g. electrical generators, top drives, draw works, etc.) often emits electrical currents into the surrounding formations that can interfere with successful reception of data transmitted by EM telemetry at the surface. It is not uncommon for multiple directional drilling operations to be conducted simultaneously in close proximity to one another with each drilling operation using a different frequency for EM telemetry transmissions to allow for differentiation of the signals detected at surface.

U.S. Pat. No. 8,400,326 describes instrumenting an appraisal well on the sea floor to receive data telemetry from another well for offshore applications. The instrumentation in the form of one or more telemetry receivers may be permanently installed in the appraisal well. Such permanently installed receivers may be prohibited in land-based drilling applications. It may be difficult or impossible to change the location of a permanently installed receiver in an appraisal well after installation. For example, it is not uncommon that the feedback from drilling operations in a region reveals information about the existence of highly conductive formations (i.e. formations that make EM transmission difficult) which might not have been detected in any prior resistivity analysis.

U.S. Pat. No. 9,459,371 describes a system for receiving EM telemetry signals that involves a retrievable cable antenna that can be lowered down another nearby borehole to receive EM telemetry signals. This system relies on the availability of a suitable nearby borehole in which the cable antenna can be deployed. This system would not be expected to work in a cased borehole because the electrically-conductive casing would act as a shield, preventing reception of EM telemetry signals at the cable antenna.

There remains a need for practical and cost effective ways to receive EM telemetry signals that improve on existing technologies.

SUMMARY

This invention has a number of aspects. One aspect provides recoverable apparatus deployable into a cased wellbore to receive electromagnetic telemetry signals originating from another wellbore. Another aspect provides methods for receiving EM telemetry signals.

According to some aspects, a system for receiving electromagnetic (EM) telemetry signals comprises: a multi-conductor wireline deployable into a first wellbore, the wireline comprising a plurality of conductors electrically isolated from one another; a signal pickup on the wireline, the signal pickup comprising a plurality of electrodes longitudinally spaced apart from one another along the wireline, each of the electrodes electrically connected to a different corresponding one of the plurality of conductors of the wireline; surface equipment connected at an uphole end of the wireline, the surface equipment comprising: electronic circuits electrically connected to each of the electrodes by way of the corresponding conductors of the wireline, the electronic circuits configured to monitor potential differences between pairs of the electrodes; an EM telemetry signal decoder; and a switch operative to direct a signal representing the potential difference between one of the pairs of the electrodes to the EM telemetry signal decoder.

The first wellbore may comprise a first casing, and the plurality of electrodes may be each adapted to electrically contact the first casing when the signal pickup is deployed into the first wellbore.

The signal pickup may comprise an elongated body anchored to the wireline and the electrodes of the plurality of electrodes may be spaced apart along the body.

A plurality of the electrodes may each comprise a ring extending circumferentially around the elongated body.

The surface equipment may comprise a logic unit, and the logic unit may be configured to measure a signal to noise ratio (SNR) of at least one of the potential differences.

The logic unit may be configured to operate the switch to select the potential difference at least in part based on the SNR of at least one of the potential differences.

The surface equipment may comprise a reel, a reel controller operatively connected to the reel, and the reel controller may be configured to operate the reel to raise or lower the signal pickup within the first wellbore at least in part based on the SNR of at least one of the potential differences.

The surface equipment may comprise a noise reduction unit, the electronic circuits may be configured to measure at least two potential differences between at least three of the electrodes, the switch may be operative to direct at least two signals representing the at least two potential differences to the noise reduction unit, and the noise reduction unit may be configured to remove a common mode noise from at least one of the at least two potential differences.

The surface equipment may comprise an EM transmitter, and the EM transmitter may be configured to drive a potential difference representing an EM transmission signal between two of the electrodes by way of the corresponding conductors of the wireline.

The first wellbore may comprise a first casing, and the first casing may comprise a first electrically-conductive section and a second electrically-conductive section attached to one another and electrically insulated from one another by an electrically insulating gap, and one of the plurality of electrodes may be in electrical contact with the first section of the first casing and a second of the plurality of electrodes may be in electrical contact with the second section of the first casing.

The system may comprise an EM telemetry transmitter deployed in a second wellbore, and the EM telemetry transmitter may be in communication with the surface equipment.

The EM telemetry transmitter may be in communication with the surface equipment by way of one or more electrical cables connected to the EM telemetry transmitter and the surface equipment.

The EM telemetry transmitter may be configured to transmit EM telemetry signals and to set one or more properties of the EM telemetry signals based at least in part on the signal received at the EM telemetry signal decoder.

The plurality of the electrodes each may comprise a bias mechanism, wherein each bias mechanism expands or contracts in a direction radial to the signal pickup. Each bias mechanism may comprise a spring, and/or an actuator.

The system may comprise an amplifier connected to receive a signal from at least one of the electrodes, and an output of the amplifier may be connected to the corresponding conductor.

The system may comprise a multiplexer connected to receive at least two signals from at least two of the electrodes and output two of the at least two signals from the electrodes to an amplifier, and an output of the amplifier is connected to a conductor of the wireline.

A weight bar may be anchored to the signal pickup.

A reference electrode may be connected to the electronic circuits, the electronic circuits may be configured to monitor potential differences between any one of the electrodes and the reference electrode, and the switch may be operative to direct a signal representing the potential difference between any one of the electrodes and the reference electrode to the EM telemetry signal decoder.

The reference electrode may be: electrically connected to the ground, electrically connected to a first casing of the first wellbore, and/or electrically connected to a second casing of a second wellbore.

The first wellbore may be filled with a high-resistivity fluid. The high-resistivity fluid may comprise an oil-based drilling fluid.

According to some aspects, a system for receiving electromagnetic (EM) telemetry signals may comprise: a first wellbore cased with a first electrically conductive casing; a wireline deployable into the first wellbore, the wireline comprising a plurality of conductors electrically isolated from one another; and a signal pickup on the wireline, the signal pickup comprising a plurality of electrodes longitudinally spaced apart from one another along a downhole end of the wireline, each of the electrodes electrically connected to a different corresponding one of the plurality of conductors of the wireline, and at least one of the electrodes in electrical contact with the first casing.

The system may comprise surface equipment connected at an uphole end of the wireline, the surface equipment comprising: electronic circuits electrically connected to each of the electrodes by way of the corresponding conductors of the wireline, the electronic circuits configured to measure at least one potential difference between at least two of the electrodes; an EM telemetry signal decoder; and a switch operative to direct a signal representing one of the at least one potential difference to the EM telemetry signal decoder.

According to some aspects, a method for communicating data from a downhole location in a first wellbore to the surface may comprise: encoding the data for transmission by electromagnetic (EM) telemetry signals; at the downhole location transmitting the encoded data as EM telemetry signals; and at a second wellbore cased with an electrically conductive casing receiving the EM telemetry signals at a pickup unit within the casing by monitoring electrical currents induced in the casing by the EM telemetry signals.

The pickup unit may comprise a plurality of electrodes longitudinally spaced apart along the second wellbore, and monitoring the electrical currents may comprise measuring at least one potential difference between at least two of the electrodes.

Each of the electrodes may be electrically connected to surface equipment by a corresponding conductor of a multi-conductor wireline disposed in the second wellbore and measuring the at least one potential difference between the at least two of the electrodes may be performed at the surface equipment.

The method may comprise measuring at the surface equipment a signal to noise ratio (SNR) of each of the at least one potential difference.

The method may comprise, at the surface equipment, selecting one of the at least one potential difference for use in decoding the EM telemetry signal at least in part based on the SNR of the at least one potential difference.

According to some aspects, a method for receiving electromagnetic (EM) telemetry signals may comprise: deploying a signal pickup unit comprising a plurality of electrodes into a first wellbore cased with an electrically conductive casing so that at least two of the electrodes are electrically connected to the casing; and measuring at least one potential difference between at least two of the electrodes from an electrical current induced in the casing from the EM telemetry signals.

Each of the electrodes may be electrically connected to surface equipment by a corresponding conductor of a multi-conductor wireline disposed in the first wellbore and measuring the at least one potential difference between the at least two of the electrodes may be performed at the surface equipment.

The method may comprise deploying the signal pickup unit at a location in the first wellbore, wherein the location is determined at least in part on the SNR of the at least one potential difference.

The method may comprise measuring at the surface equipment at least two potential differences between at least three of the electrodes, and removing a common mode noise from at least one of the at least two potential differences.

The method may comprise transmitting an EM transmission signal by driving a potential difference representing the EM transmission signal between two of the electrodes by way of the corresponding conductors of the wireline.

The method may comprise deploying the signal pickup unit at a location in the first wellbore wherein the at least two of the electrodes are electrically connected to the first casing on alternate sides of an electrically insulating gap of the first casing.

The method may comprise transmitting the EM telemetry signals from a second wellbore.

The method may comprise optimizing the EM telemetry signals based at least in part on the at least one measured potential difference.

The method may comprise expanding or contracting the electrodes in a direction radial to the first wellbore.

The method may comprise at the signal pickup unit amplifying the at least one potential difference.

The method may comprise filling the first wellbore with a high-resistivity fluid.

According to some aspects, a method for receiving electromagnetic (EM) telemetry signals may comprise: deploying a signal pickup unit comprising a plurality of pickup electrodes into a first wellbore cased with a first electrically conductive casing so that at least one of the pickup electrodes is electrically connected to the casing; and measuring at least one potential difference between at least one of the pickup electrodes and a reference electrode from an electrical current induced in the casing from the EM telemetry signals.

Measuring the at least one potential difference may comprise measuring at least one potential difference between at least one of the pickup electrodes and the ground.

Measuring the at least one potential difference may comprise measuring at least one potential difference between at least one of the pickup electrodes and the first casing.

Measuring the at least one potential difference may comprise measuring at least one potential difference between at least one of the pickup electrodes and a second casing of a second wellbore.

According to some aspects, a method for communicating data from a downhole location in a first wellbore to the surface may comprise: encoding the data for transmission by electromagnetic (EM) telemetry signals; at the downhole location transmitting the encoded data as EM telemetry signals; inducing a current in an electrically conductive casing of a second wellbore; and measuring the current induced in the casing of the second wellbore.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
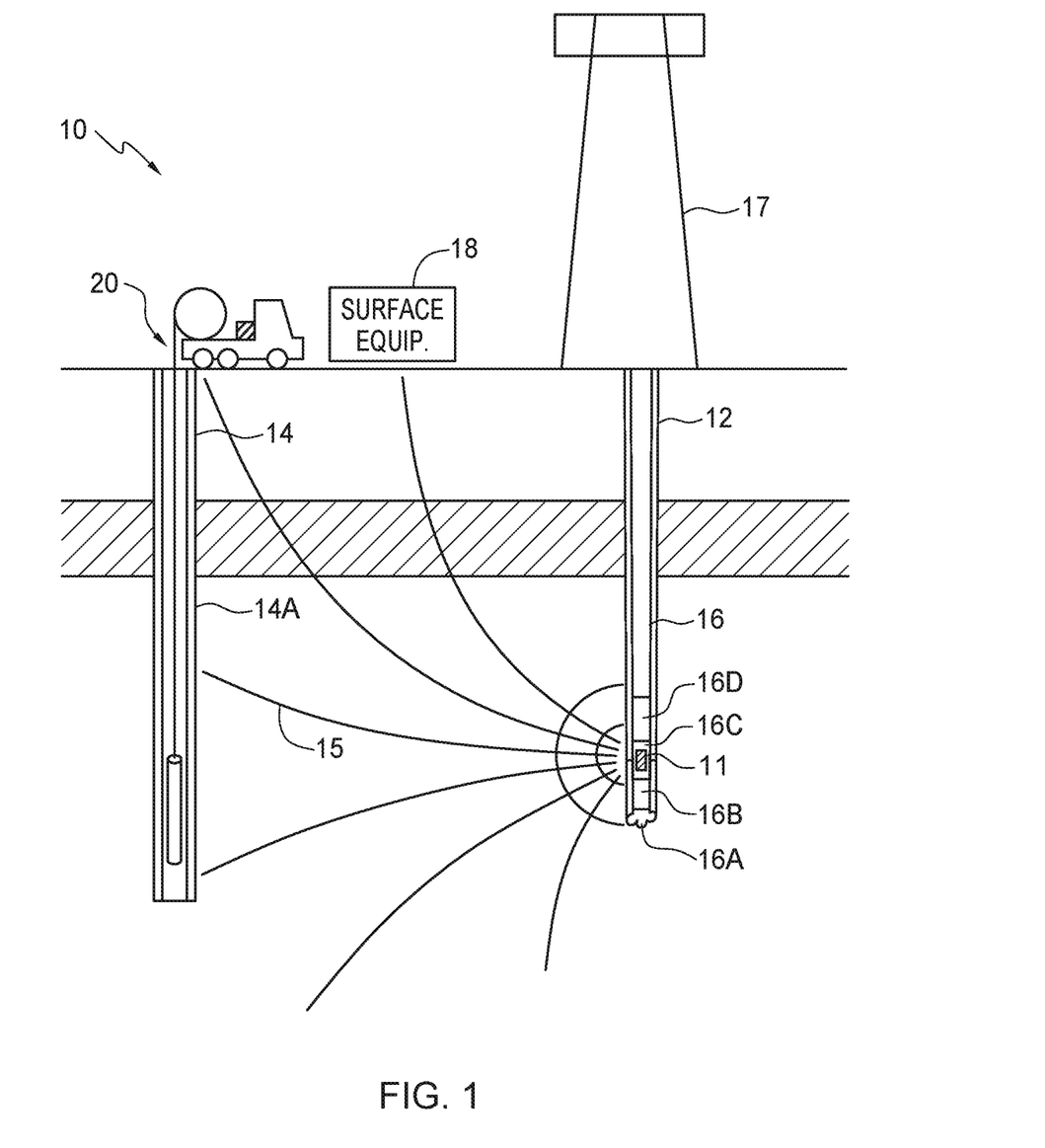
FIG. 1 is a schematic overview of a drilling operation including a system according to an example embodiment of the invention.

One aspect of this invention provides a retrievable system that may be deployed in a cased wellbore to receive EM telemetry signals originating from a downhole location in another nearby wellbore. FIG. 1 schematically illustrates an example system 10 in which a downhole EM telemetry transmitter 11 is located in a first wellbore 12 and a signal detection system 20 is retrievably deployed in a second nearby wellbore 14.

Second nearby wellbore 14 is cased, having a casing 14A. EM telemetry signals (indicated schematically by lines 15) radiate from EM telemetry transmitter 11. Signals 15 induce electrical currents in casing 14A. Casing 14A acts as an antenna that receives the EM telemetry signals. The currents that flow in casing 14A are detected at signal detection system 20.

Signals representing the currents detected at signal detection system 20 are passed to surface equipment 18 which extracts and processes the data encoded in EM telemetry signals 15. Processing may include storing, transmitting, displaying, relaying or otherwise dealing with the data.

In the illustrated embodiment, EM telemetry transmitter 11 is carried by a drillstring 16 which includes a drill bit 16A, a bottom hole assembly (BHA) 16B, a gap sub 16C and a string of tubulars 16D leading to a drill rig 17 at the surface.

Figure 2:
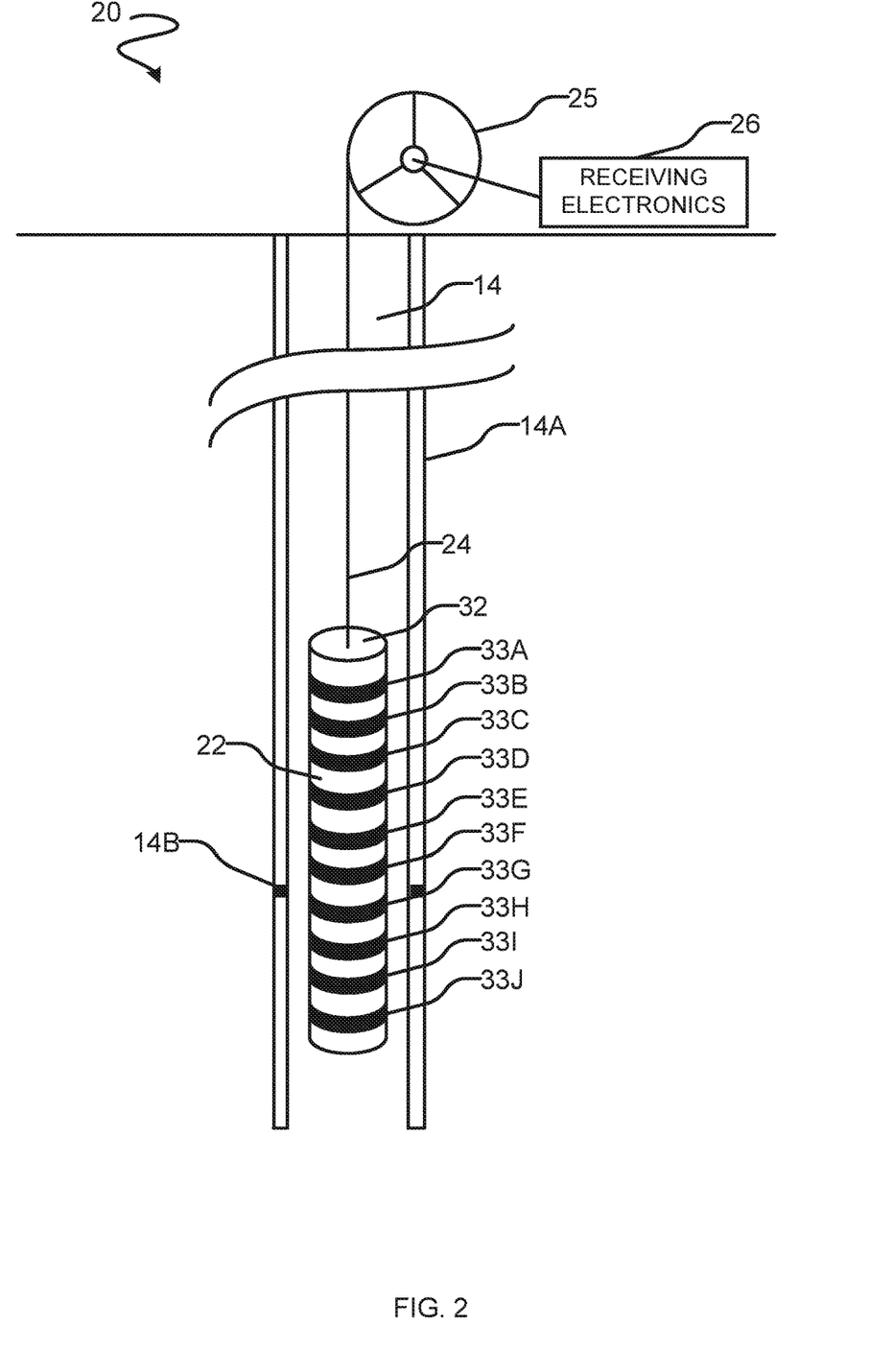
FIG. 2 is a more-detailed schematic view of an EM telemetry receiver system that uses a casing of a cased well as an antenna to detect EM telemetry signals, including details of an example signal pickup unit.

FIG. 2 shows a more detailed view of an example signal detection system 20. Signal detection system 20 comprises a signal pickup unit 22 that is supported in wellbore 14 by a wireline 24. In the illustrated embodiment the surface end of wireline 24 is carried by a reel 25. Reel 25 may be operated to adjust the elevation of pickup unit 22 in wellbore 14. In some embodiments reel 25 is automatically controlled by a reel controller (e.g. to adjust a downhole position of signal pickup unit 22 for optimum reception of EM telemetry signals). In some embodiments signal detection system 20 includes an interface that provides instructions to an operator of reel 25 to e.g. raise or lower signal pickup unit 22 and/or adjust a travel speed of pickup unit 22. The interface may, for example, comprise a display. In some embodiments reel 25 is manually controlled and not explicitly connected to the rest of system 20.

Surface equipment 18 that includes receiving electronics 26 is at the surface and connected to pickup unit 22 by way of electrical conductors in wireline 24. Receiving electronics 26 may include, for example, signal conditioning electronics such as one or more amplifier, one or more filter, one or more analog-to-digital converter (ADC) and signal processing electronics. The signal processing electronics may include a programmed data processor that executes software instructions, custom logic circuits and/or configurable logic circuits (such as field-programmable gate arrays—FPGAs) configured to retrieve the data encoded in received EM telemetry signals.

As noted above, wellbore 14 is cased with a casing 14A. Pickup unit 22 is operable to detect electrical currents induced in casing 14A by EM telemetry signals 15. Pickup unit 22 may measure electrical currents flowing in a localized area of casing 14A. The localized area may, for example, have a length in the range of 10 cm to 10 m.

In an example embodiment, pickup unit 22 provides plural electrodes that are spaced apart from one another and located on an outside of pickup unit 22 such that the electrodes can each sense an electrical potential at a particular location on casing 14A. Current flows in casing 14A will cause the electrical potential to vary with position along casing 14A. Such current flows can therefore be detected by comparing the electrical potential sensed by different ones of the electrodes of pickup unit 22. Pickup unit 22 preferably includes more than two electrodes.

In some embodiments, pickup unit 22 is connected to both casing 14A, and one or more electrical conductors such as reference stakes that are in electrical contact with the ground. A reference stake may comprise an electrically conductive part of a structure that is in contact with the ground, a ground rod, a ground plate, or the like. For example, a reference stake may be provided by the casing of the first well 12. An example location to which a reference input of pickup unit 22 may be connected is a blow-out-preventer (BOP) of the rig of well 12. In another example, a reference stake is provided by the casing of another nearby well other than well 12 or 14. Electrical potentials between one or more reference stakes and one or more electrodes of pickup unit 22 may be used instead of or in addition to electrical potentials between different electrodes of pickup unit 22 to detect EM telemetry signals 15.

FIG. 2 shows a system according to an example embodiment wherein pickup unit 22 comprises an elongated body 32 that carries electrodes 33 spaced apart along an outer surface of the body. Electrodes 33 are electrically isolated from one another. Pickup unit 22 preferably includes more than two electrodes 33. The illustrated embodiment shows the example case where pickup unit 22 comprises ten electrodes 33 (labelled 33A to 33J). In this example each electrode 33 has the form of a ring that extends circumferentially around body 32. Advantageously, pickup unit 22 may be dimensioned to provide plural pairs of electrodes 33 in which the electrodes 33 of each pair are separated from one another by distances of about 1 m or more. In an example embodiment, electrodes 33 are spaced apart along pickup unit 22 with a longitudinal spacing in the range of 1 m to 3 m.

In another example embodiment, elongated body 32 is approximately 2.5 to 5 centimeters (1 to 2 inches) in diameter, and approximately 1.8 to 9 meters (6 to 30 feet) in length. Elongated body 32 optionally has a weight in the range of between 45 and 90 kilograms (100 and 200 lbs.).

Environmental conditions in well 14 may include high pressures. In an example embodiment, elongated body 32 is rated to withstand pressures up to approximately 15,000 psi (about $10^5$ kPa).

Electrodes 33 are preferably configured to make direct contact with casing 14A. To facilitate this, electrodes 33 may comprise a structure that is expandable so that electrically conductive surfaces of the electrode are brought into positive contact with casing 14A. This structure may be a passive structure or an active structure. Examples of passive structures include springs or other resilient members that bias electrically-conductive parts of electrodes 33 against the inner wall of casing 14A. For example the electrodes may comprise leaf springs that are biased to expand outwardly away from body 32 or pivotally-mounted arms biased to expand radially outwardly by springs (e.g. coil springs, torsion springs, or the like) or other suitable bias means. For example, the structures that engage electrodes 33 with casing 14A may have structures similar to those used to centralize wireline tools. Active structures include an actuator controlled from the surface that is connected to bring electrodes 33 into contact with casing 14A. An active structure may include, for example, an electric motor or motors that can be supplied with power by way of conductors in wireline 24 to drive a mechanism such as a screw or cam or hydraulic system operable to force electrodes 33 outwardly or to retract electrodes 33. Where an active structure is supplied the structure may resiliently support individual electrodes 33 to allow each electrode 33 to make electrical contact with the portion of the wall of casing 14A that it is adjacent to.

In some wellbores, the casing in a wellbore decreases in diameter with depth. Electrodes 33 that are movable radially relative to body 32 may accommodate changes in the inner diameter of casing 14 and/or allow the same apparatus to be deployed into boreholes cased with a casing 14A of different diameters.

Electrodes 33 may be made of any suitable electrically-conductive material. For example, electrodes 33 may be made of a suitable grade of stainless steel. The portions of body 32 between electrodes 33 are preferably electrically-insulating.

Preferably wireline 24 provides enough individual conductors to provide a dedicated electrical conductor for each of electrodes 33. This construction allows surface equipment to measure potential differences between any pair of electrodes 33. The surface equipment may be configured to optimize reception of individual EM telemetry signals by selecting pairs of electrodes 33 from which the individual EM telemetry signals can be effectively recovered.

Figure 3A:
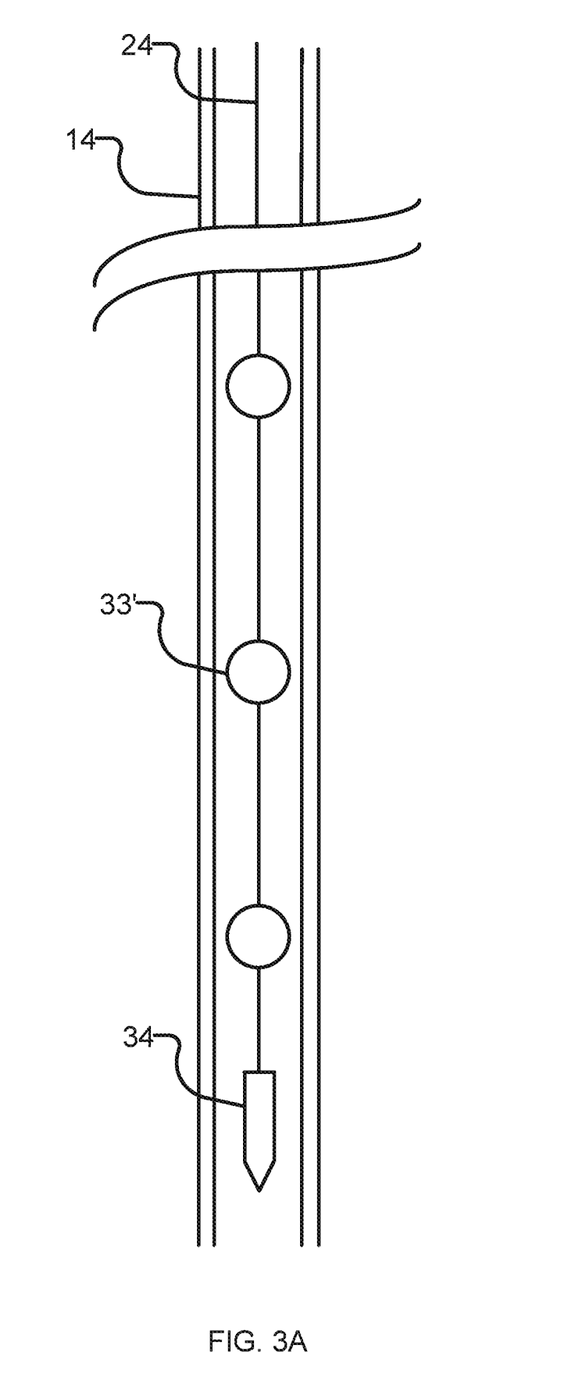
FIGS. 3A and 3B are schematic views of EM telemetry receiver systems according to other example embodiments.

FIG. 3A shows a system according to an alternative embodiment in which rounded electrodes 33' are distributed at spaced apart locations along wireline 24. In the illustrated example, electrodes 33' are spherical. The electrodes could have other rounded shapes that allow them to smoothly pass into wellbore 14. The diameter of the electrodes may be chosen to be smaller than the smallest inner diameter encountered in casing 14A at the depths at which electrodes 33' will be deployed. The diameter may be as large as practical in some embodiments (e.g. slightly smaller than the smallest internal diameter of casing 14A). Embodiments of the general type illustrated in FIG. 3A may be well suited to cases where borehole 14 has non-zero inclination, or where the electrodes will be placed in a curved section of the wellbore 14 such that electrodes 33' are brought into contact with casing 14A by gravity. Each electrode 33' is connected to a single conductor of wireline 24 and isolated from all other electrodes 33'. A weight bar 34 is located at or near a downhole end of wireline 24. Weight bar 34 may have a weight chosen based on the number of electrodes 33' and casing diameter. Weight bar 34 does not need to be connected to any conductors of wireline 24.

Figure 3B:
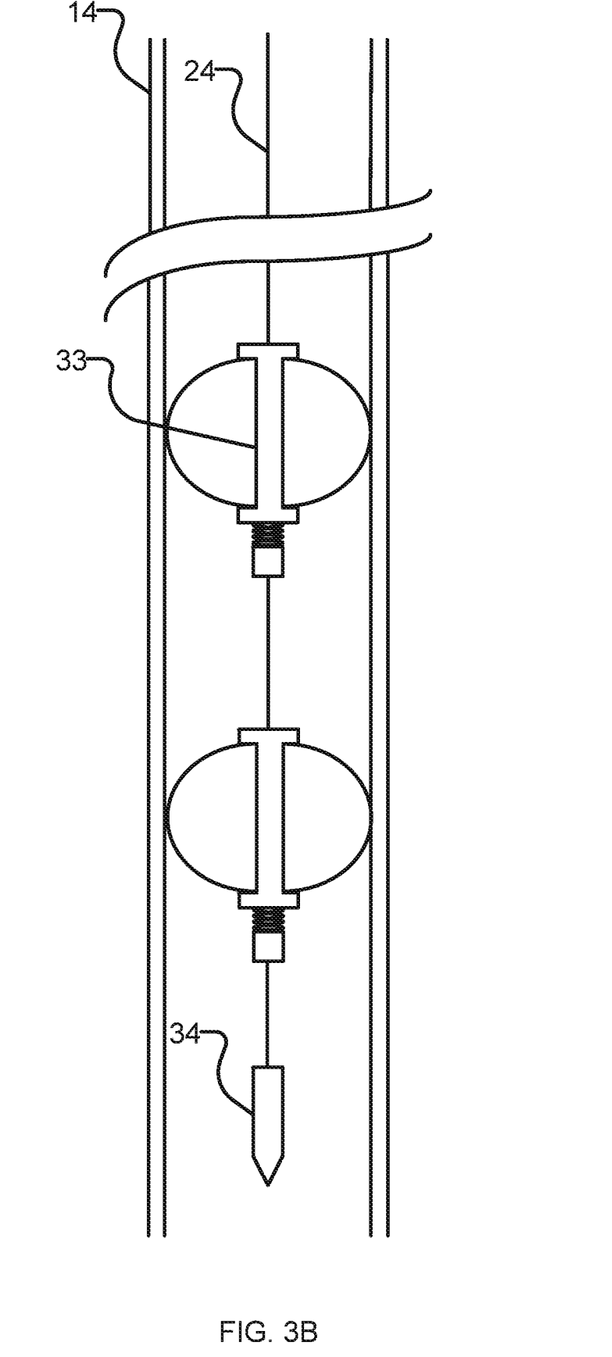

FIG. 3B shows a further example embodiment wherein each electrode includes flexible or hinged members that when compressed axially expand radially to maximize contact with the bore. Each electrode is connected to a single conductor of wireline 24 and electrically isolated from other ones of the electrodes.

Wellbore 14 may contain a fluid that optimizes detection of and/or transmission of EM telemetry signals from apparatus in wellbore 14. For example, wellbore 14 may contain a high-resistivity fluid such as an oil-based fluid (commonly termed 'invert') or high pressure air. Such high-resistivity fluids are beneficial for both transmitting and receiving EM telemetry transmissions. Where wellbore 14 is an existing wellbore (not currently being drilled) the fluid in wellbore 14 may be chosen for its EM telemetry transmission and/or reception properties with less concern for drilling characteristics.

Figure 4:
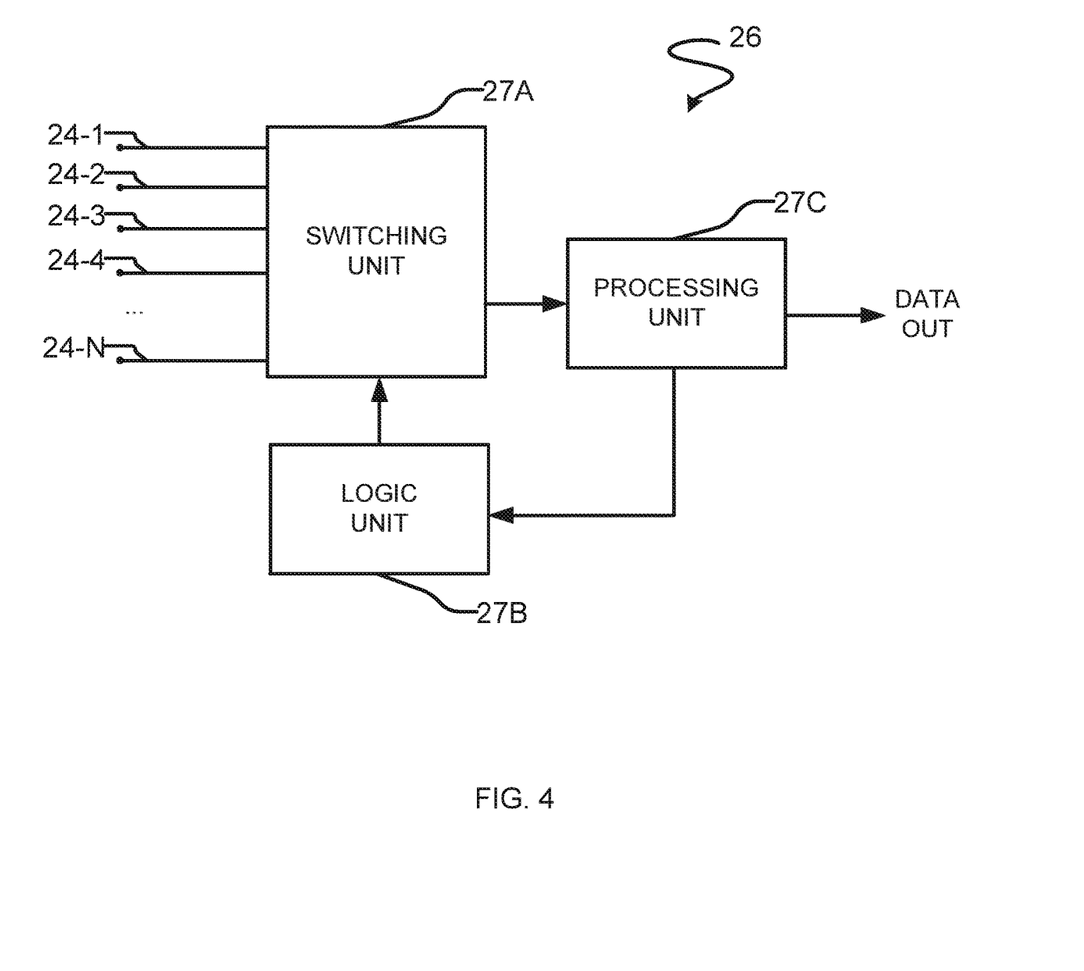
FIG. 4 is a block diagram of example receiving electronics.

FIG. 4 is a block diagram that illustrates schematically non-limiting example receiving electronics 26. Receiving electronics 26 comprises a switching unit 27A connected to receive signals from conductors 24-1 to 24-N of wireline 24. Switching unit 27A can select one pair of conductors 24-1 to 24-N to use for receiving a particular EM telemetry signal under control of a logic unit 27B. The signal from the selected pair of conductors is output by switching unit 27A to a processing unit 27C that processes the signal to extract the data encoded in the received EM telemetry signal.

Logic unit 27B may base a decision on which pair of electrodes 33 to use to receive a particular EM telemetry signal on signal quality metrics such as:
  signal-to-noise ratio (SNR);
  signal strength;
  signal quality consistency;
  electrical conductivity measured for the pair of electrodes 33 or for individual ones of electrodes 33 and casing 14A (the conductivity of the connection between one electrode 33 and casing 14A may be inferred by measuring electrical conductivity between that electrode 33 and two or more other ones of electrodes 33); or
  combinations of any two or more of these.

In some embodiments receiving electronics 26 uses 3 or more electrodes or two or more pairs of electrodes to improve detection/reception of EM telemetry signals. In some such embodiments common mode noise can be measured across a plurality of electrode pairs (which could be all electrode pairs). The measured common mode noise can then be removed from the signal.

Figure 5:
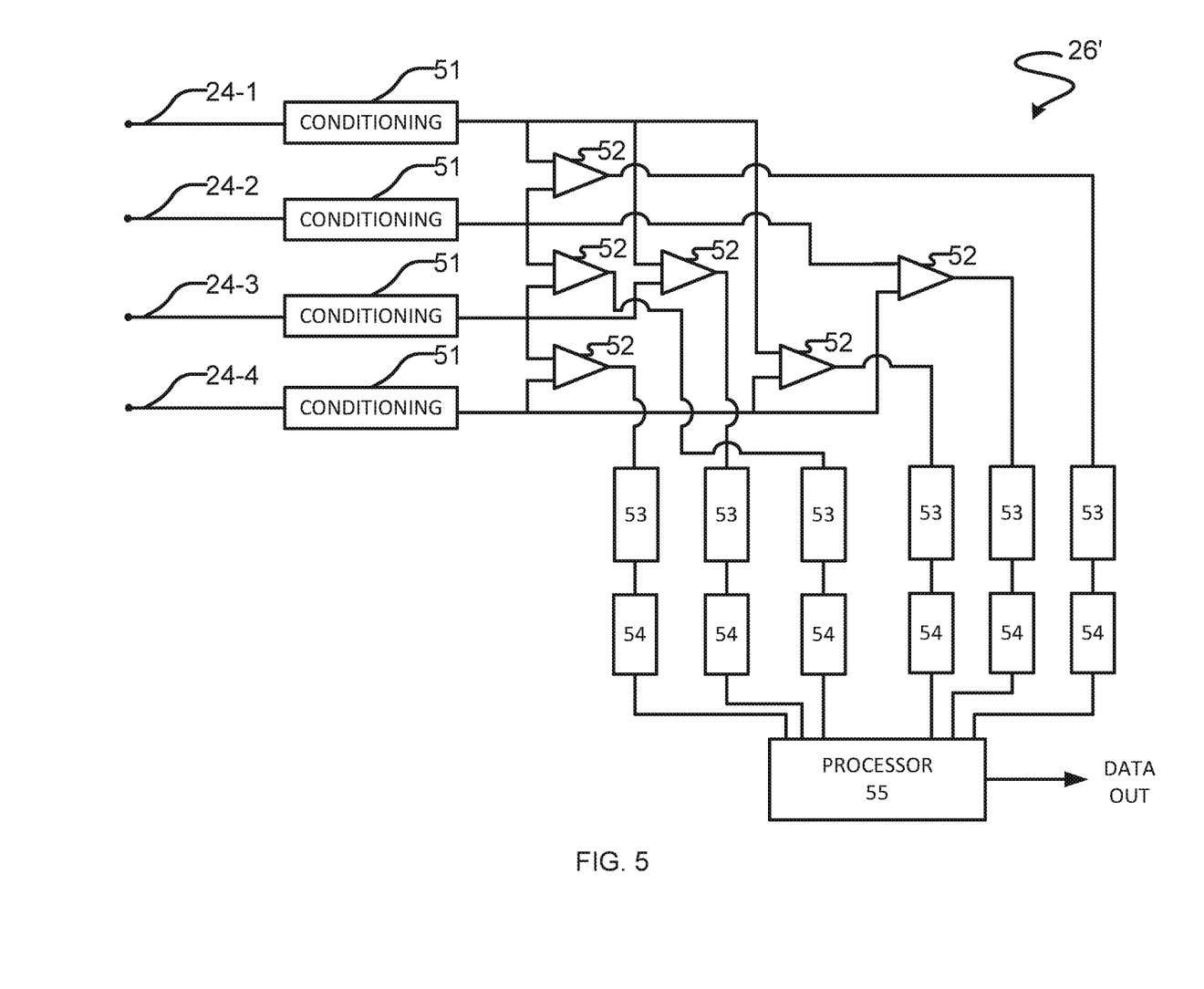
FIG. 5 is a schematic illustration of receiving electronics according to another example embodiment.

FIG. 5 is a schematic illustration of another example of receiving electronics 26'. Receiving electronics 26' has N inputs, each input available for connection to one of electrodes 33 via a conductor of wireline 24. Each input connects to a signal conditioning circuit 51 that may include filtering (e.g. low-pass filtering) and/or amplification. For ease of illustration only four inputs are shown in FIG. 5.

A plurality of differential amplifiers 52 each has first and second inputs respectively connected to outputs of different ones of signal conditioning circuits 51. Each of differential amplifiers 52 provides an output carrying a difference signal representative of the potential difference between a corresponding pair of electrodes 33. An output of each differential amplifier 52 connects to an input of a second signal conditioning circuit 53. Outputs of signal conditioning circuits 53 are converted to digital format by ADCs 54. The resulting digitized signals are delivered to a data processor 55. Data processor 55 may further process the signals (e.g. by digital filtering or other digital signal conditioning) and then process a selected one of the signals to extract encoded EM telemetry data.

Instead of providing separate electronics to condition and detect signals from every pair of electrodes 33, receiving electronics 26 may include a switching network configured to selectively apply a signal from one pair of electrodes to a common differential amplifier and/or to deliver output signals from a selected differential amplifier 52 to a common ADC 54.

In some embodiments the receiving electronics includes dedicated electronics (e.g. a dedicated differential amplifier) for receiving each one of one or more EM telemetry signals. The switching network may be configured to deliver output from a selected pair of electrodes 33 to the dedicated electronics for an EM telemetry signal. The receiving electronics may comprise an additional differential amplifier for use in monitoring signals from other pairs of electrodes 33. The switching network may be operated to use circuitry incorporating the additional differential amplifier, in turn, to monitor outputs from the other pairs of electrodes and to determine signal quality metrics for the signals received at the other pairs of electrodes. This construction facilitates uninterrupted reception of EM telemetry signals using a pair of electrodes 33 simultaneously with monitoring to determine whether an alternative selection of electrodes 33 might provide improved reception.

Under some circumstances a system as described herein may receive different EM telemetry signals that are distinguished from one another by frequency. These signals may originate from the same or different EM telemetry transmitters and may originate from the same or different wellbores. In some embodiments receiving electronics may assign a particular pair of electrodes 33 to receive each distinct EM telemetry signal. Different pairs of electrodes 33 may be assigned for some different ones of the EM telemetry signals. The same pair of electrodes 33 may be assigned to two or more different ones of the EM telemetry signals. Selection of a pair of electrodes 33 to use may be performed separately for each distinct EM telemetry signal to be received.

In some embodiments, once a specific pair of electrodes 33 has been assigned to receive a specific EM telemetry signal or set of EM telemetry signals, signal processing circuitry associated with one or both of those electrodes 33 may be tuned (e.g. by adjusting filters) to optimize reception of the selected EM telemetry signal(s).

As noted above, the depth at which pickup unit 22 (or electrodes 33) is located may be adjusted by raising or lowering wireline 24. Raising or lowering wireline 24 may be used to optimize reception of EM telemetry signals. In one embodiment, wireline 24 is slowly adjusted up and down as one or more EM telemetry signals are received. Quality metrics of the one or more EM telemetry signals may be measured as a function of wireline position. A suitable wireline position for receiving the EM telemetry signals may then be determined and wireline 24 may be set to the determined suitable position.

Another method for establishing a suitable position for wireline 24 in wellbore 14 comprises causing EM telemetry signals to be transmitted from an EM telemetry transmitter in wellbore 12 while wireline 24 is run into borehole 14 and monitoring in real time the signals detected at pairs of electrodes 33. The transmitted EM telemetry signals may optionally comprise predetermined signals that are selected to be easy to detect and/or to facilitate measurement of the quality of received signals. After wireline 24 has been run into wellbore 14 to a predetermined depth a record of one or more quality metrics for EM signal reception as a function of wireline position may be processed to determine a suitable wireline position for receiving the EM telemetry signals. In some embodiments two or more EM telemetry signals are detected as wireline 24 is run into wellbore 14 and the suitable wireline positions may be determined based on signal quality metrics for each of the two or more EM telemetry signals.

The transmitted EM telemetry signals may have a relatively high amplitude and a relatively low frequency to improve the strength of the EM telemetry signals that reach wellbore 14. The transmitted EM telemetry signals may comprise a continuous AC waveform in some embodiments (e.g. a continuous square or sinusoidal wave may be transmitted).

In some embodiments EM telemetry signals may be transmitted using electrodes 33 of a system as described herein. A pair of electrodes 33 not being used to receive EM telemetry signals may be used to transmit the EM telemetry signals. In the alternative, the same pair of electrodes 33 that are being used to receive an EM telemetry signal from a particular source may also be applied to transmit EM telemetry signals for reception at that particular source. In another alternative a pair of electrodes 33 being used to transmit EM telemetry signals may have one electrode 33 in common with another pair of electrodes being used to receive EM telemetry signals.

Bi-directional communication using the electrodes 33 of a system as described herein may be applied, for example to further optimize communications from EM telemetry transmitter 11. For example, electrodes 33 may be used to transmit commands to an EM telemetry receiver associated with EM telemetry transmitter 11 that cause EM telemetry transmitter 11 to alter the properties of its transmissions (e.g. to change one or more of frequency, amplitude, data encoding mode, selection of data to be transmitted) in order to achieve goals such as:

better reception at wellbore 14;
higher data throughput;
higher signal-to-noise ratio (SNR);
greater reliability;
lower latency; and/or
power conservation at EM telemetry transmitter 11.

A surface-located EM telemetry transmitter may deliver EM telemetry signals to the selected electrodes 33 by way of conductors in wireline 24. In some embodiments casing 14A includes an electrically-insulating gap 14B (see FIG. 2). Wireline 24 may be positioned such that a pair of electrodes 33 that is to be used to transmit EM telemetry signals are located on opposing sides of gap 14B. Appropriate positioning of the selected pair of electrodes may be detected by monitoring the impedance between the pair of electrodes as wireline 24 is lowered or raised in wellbore 14. As one of the pair of electrodes 33 crosses gap 14B in casing 14A the impedance will step upwards.

If the position of wireline 24 is adjusted up or down (e.g. to enhance reception of certain EM telemetry signals) such that one of a pair of electrodes 33 being used to transmit EM telemetry signals crosses over gap 14B a different pair of electrodes may be selected for use in transmitting EM telemetry signals. Gap 14B may have any suitable construction. For example, gap 14B may have a construction similar to the construction of a gap sub. A side variety of gap sub constructions are described in the literature and/or are commercially available.

In some embodiments, one or more amplifiers are provided downhole close to one or more of electrodes 33. The one or more amplifiers may be connected to amplify the potential difference between two of electrodes 33. Outputs of the amplifiers may be connected to conductors of wireline 24. The amplifiers may be ultra-low-noise analog amplifiers.

The amplifiers may be battery powered, or supplied with power by way of conductors in wireline 24. In some embodiments, the amplifiers may have a fixed gain, or be equipped with an automatic gain control method in order to automatically adjust the output signal level to a targeted range. In some embodiments, the amplifiers may be controlled by logic unit 27B, processing unit 27C, and/or processor 55, in order to automatically adjust the output signal level to a targeted range.

Figure 6:
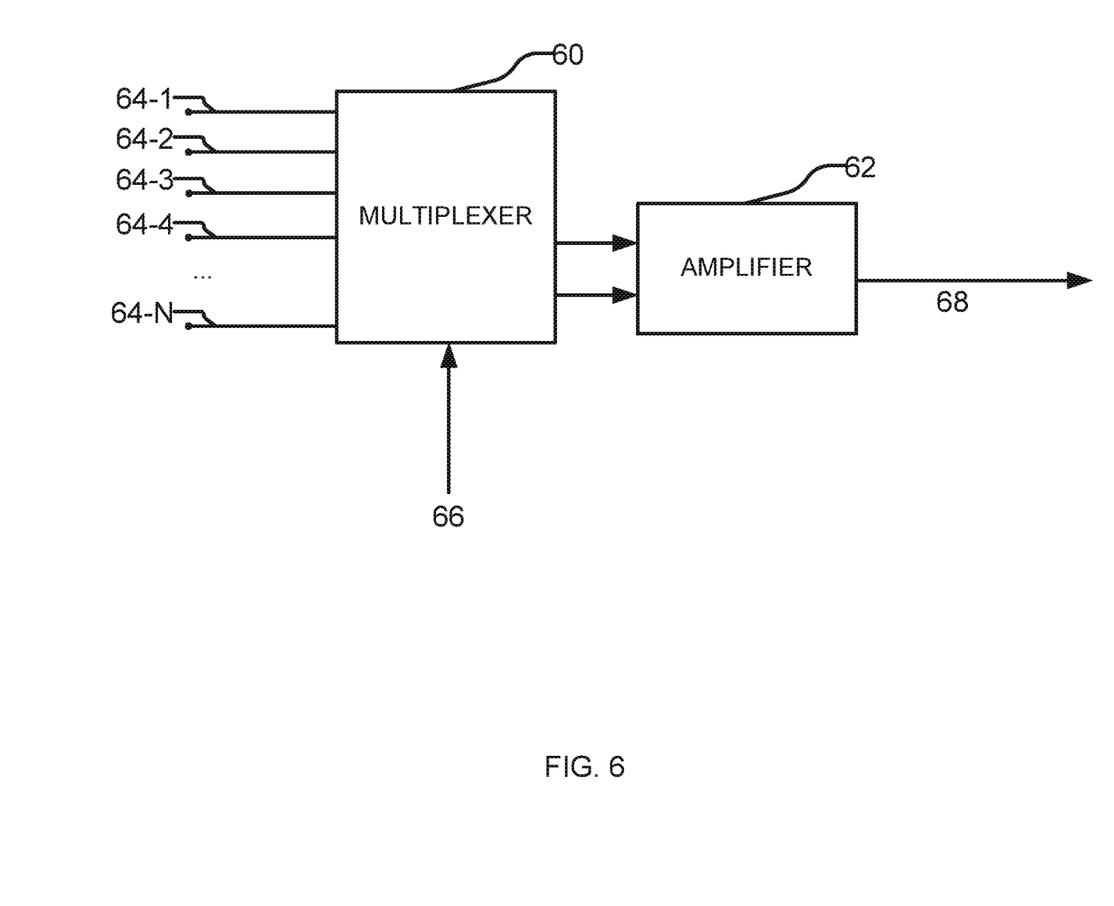
FIG. 6 is a schematic illustration of a downhole multiplexer and amplifier according to another example embodiment.

FIG. 6 is a schematic illustration of an example embodiment wherein a multiplexer 60 and an amplifier 62 are provided downhole, proximate to signal pickup unit 22. Multiplexer 60 is connected to receive signals 64-1 to 64-N from electrodes 33. Control input 66 of multiplexer 60 may be connected to receiving electronics 26 by way of one or more conductors in wireline 24. Depending on control input 66, multiplexer 60 selects two of input signals 64-1 to 64-N to output to amplifier 62. Amplifier 62 provides output signal 68, which is an amplified difference between the two selected input signals. Output signal 68 may be connected to receiving electronics 26 by way of one or more conductors in wireline 24. Logic unit 27B of surface electronics 26 may operate multiplexer 60 by way of control input 66 to select two of input signals 64-1 to 64-N based on signal quality metrics such as:
- signal-to-noise ratio (SNR);
- signal strength;
- signal quality consistency;
- electrical conductivity measured for the pair of electrodes 33 or for individual ones of electrodes 33 and casing 14A (the conductivity of the connection between one electrode 33 and casing 14A may be inferred by measuring electrical conductivity between that electrode 33 and two or more other ones of electrodes 33); or
- combinations of any two or more of these.

In some embodiments, surface logic unit 27B may control multiplexer 60 to cycle through all possible combinations of input signals 64-1 to 64-N, and select a pair of input signals 64-1 to 64-N based on the measured signal quality metric of each combination of input signals 64-1 to 64-N.

Some embodiments advantageously lack any active electronics downhole in wellbore 14. This can make the system that is deployed on wireline 24 particularly robust and compact since no temperature-sensitive electronics are required to be downhole in wellbore 14.

Interpretation of Terms

Unless the context clearly requires otherwise, throughout the description and the

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Surface equipment according to various embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel(s).

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

Certain aspects of the invention may also be provided in the form of a program product. The program product may comprise any non-transitory medium which carries a set of computer-readable instructions which, when executed by a data processor, cause the data processor to execute a method of the invention. For example a program product may cause a controller of a wireline to move the wireline in order to maintain good EM telemetry reception as described herein. As another example a program product may cause a data processor to record EM signal characteristics (e.g. SNR) for signals picked up at plural pairs of electrodes as a wireline is run into or out of a wellbore. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

Where a component (e.g. a software module, electrode, wire, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for receiving electromagnetic (EM) telemetry signals, the method comprising:
   lowering a wireline into a first wellbore, wherein the first wellbore is cased with an electrically conductive first casing, the wireline comprising one or more electrical conductors that extend longitudinally along the wireline from an uphole end of the wireline to a signal pickup, the signal pickup comprising a wireline electrode electrically connected to a first electrical conductor of the one or more electrical conductors;
   electrically contacting an inside surface of the first casing with the wireline electrode;
   electrically connecting the wireline electrode to an EM telemetry signal decoder by way of the first electrical conductor;
   electrically connecting a reference electrode to the EM telemetry signal decoder;
   measuring, by the EM telemetry signal decoder, a potential difference between the wireline electrode and the reference electrode, the potential difference arising as a result of an electrical current induced in the first casing by the EM telemetry signals;
   measuring a signal to noise ratio (SNR) of the potential difference; and
   deploying the signal pickup at a location in the first wellbore, wherein the location is determined at least in part by the SNR of the potential difference.

2. The method according to claim 1, further comprising, decoding, by the EM telemetry signal decoder, telemetry data encoded in the EM telemetry signals.

3. The method according to claim 1, wherein:
   the one or more electrical conductors of the wireline comprises a second electrical conductor;
   the signal pickup further comprises the reference electrode;
   the reference electrode is electrically connected to the second electrical conductor of the wireline; and the EM telemetry signal decoder is electrically connected to the reference electrode by way of the second electrical conductor of the wireline; and
   the method further comprises electrically contacting the first casing with the reference electrode.

4. The method according to claim 3, wherein the first casing further comprises a first electrically-conductive section and a second electrically-conductive section attached to one another and electrically insulated from one another by an electrically insulating gap, and wherein electrically contacting the inside surface of the first casing with the wireline electrode further comprises electrically contacting the first electrically-conductive section with the wireline electrode, and electrically contacting the first casing with the reference electrode further comprises electrically contacting the second electrically-conductive section with the reference electrode such that the gap is between the wireline electrode and the reference electrode.

5. The method according to claim 4, further comprising driving a second potential difference representing an EM transmission signal between the wireline electrode and the reference electrode.

6. The method according to claim 3, wherein the signal pickup comprises an elongated body anchored to the wireline and the wireline electrode and the reference electrode, wherein each of the wireline and the wireline electrode and the reference electrode further comprise a ring extending circumferentially around the elongated body.

7. The method according to claim 3, wherein the wireline electrode further comprises a first bias mechanism and wherein electrically contacting the inside surface of the first casing with the wireline electrode further comprises operating the first bias mechanism to move the wireline electrode to bear against the inside surface of the first casing.

8. The method according to claim 7, wherein the reference electrode further comprises a second bias mechanism, and wherein electrically contacting the first casing with the reference electrode further comprises operating the second bias mechanism to cause the reference electrode to bear against the first casing.

9. The method according to claim 1, comprising electrically connecting the reference electrode to a ground.

10. The method according to claim 1, comprising electrically contacting a second casing of a second wellbore with the reference electrode.

11. The method according to claim 1, comprising introducing a high-resistivity fluid into the first wellbore, wherein the high-resistivity fluid comprises an oil-based drilling fluid.

12. A system for receiving electromagnetic (EM) telemetry signals, the system comprising:
a wireline deployable into a first wellbore comprising a first casing, the wireline comprising one or more electrical conductors extending longitudinally along the wireline from an uphole end of the wireline to a signal pickup on the wireline, the signal pickup comprising a wireline electrode electrically connected to a first electrical conductor of the one or more electrical conductors of the wireline;
a reel operable to move the signal pickup to a position along the first wellbore,
a reference electrode; and
an EM telemetry signal decoder connected at the uphole end of the wireline, the EM telemetry signal decoder having an input electrically connected to the wireline electrode by way of the first electrical conductor of the wireline and electrically connected to the reference electrode, the EM telemetry signal decoder configured to monitor a potential difference between the wireline electrode and the reference electrode; and
surface equipment configured to measure a signal to noise ratio (SNR) of the potential difference as a function of the position along the first wellbore and to facilitate deploying the signal pickup at a location in the first wellbore that is determined at least in part by the SNR of the potential difference,
wherein the wireline electrode is adapted to electrically contact an inside surface of the first casing when the signal pickup is deployed into the first wellbore.

13. The system according to claim 12, wherein:
the one or more electrical conductors of the wireline comprises a second electrical conductor;
the signal pickup comprises the reference electrode;
the reference electrode is electrically connected to the second electrical conductor of the wireline;
the input of the EM telemetry signal decoder is connected to the reference electrode by way of the second conductor of the wireline; and
the reference electrode is adapted to electrically contact the first casing when the signal pickup is deployed into the first wellbore.

14. The system according to claim 13, wherein the signal pickup comprises an elongated body anchored to the wireline and the wireline electrode is spaced apart from the reference electrode along the elongated body.

15. The system according to claim 14, wherein the wireline electrode and the reference electrode each comprise a ring extending circumferentially around the elongated body.

16. The system according to claim 13, wherein the wireline electrode and the reference electrode each comprise a bias mechanism, wherein the bias mechanism of said each the wireline electrode and the reference electrode is operative to bias each of the wireline electrode and the reference electrode in a direction that is radially outward relative to the signal pickup.

17. The system according to claim 13 wherein the wireline electrode is one of a plurality of wireline electrodes on the signal pickup, the system further comprising a switch to selectively couple one of the plurality of wireline electrodes to the input of the EM telemetry signal decoder.

18. The system according to claim 12, wherein the wireline electrode comprises a bias mechanism, wherein the bias mechanism biases the wireline electrode radially outward relative to the signal pickup.

* * * * *